United States Patent
Chiu et al.

(10) Patent No.: US 8,662,728 B2
(45) Date of Patent: Mar. 4, 2014

(54) LIGHT MODULE

(75) Inventors: Tsai-Yi Chiu, Hsin-Chu (TW); Ping Lee, Hsin-Chu (TW); Cheng-Min Tsai, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 396 days.

(21) Appl. No.: 13/209,525

(22) Filed: Aug. 15, 2011

(65) Prior Publication Data
US 2012/0087140 A1 Apr. 12, 2012

(30) Foreign Application Priority Data
Oct. 8, 2010 (TW) .............................. 99134323 A

(51) Int. Cl.
*F21V 7/04* (2006.01)
(52) U.S. Cl.
USPC ........................................................ 362/612
(58) Field of Classification Search
USPC ................................ 362/600–634
See application file for complete search history.

(56) References Cited

U.S. PATENT DOCUMENTS 5,920,465 A 7/1999 Tanaka

FOREIGN PATENT DOCUMENTS

| CN | 101865393 A | 10/2010 |
|----|-------------|---------|
| JP | 2000252651  | 9/2000  |
| TW | 551072      | 9/2003  |
| TW | 201009450   | 3/2010  |
| TW | M383890     | 7/2010  |
| TW | 201035646   | 10/2010 |

OTHER PUBLICATIONS

English translation of abstract of TW 551072.
English translation of abstract of TW 201009450.
English translation of abstract of JP 2000-252651.
China Office Action dated Mar. 21, 2012.
English translation of abstract of CN 101865393 A.
Taiwan Office Action dated Jan. 31, 2013.
English translation of abstract of TW 201035646 (published Oct. 1, 2010).
English translation of abstract of TW M383890 (published Jul. 1, 2010).

*Primary Examiner* — William Carter
(74) *Attorney, Agent, or Firm* — McClure, Qualey & Rodack, LLP

(57) ABSTRACT

A light module is disclosed. The light module includes a first printed circuit board, a second printed circuit board, a light source, and a fixing casing, wherein the first printed circuit board and the second printed circuit board each has a fixing part, and the fixing part of the second printed board is attached to the fixing part of the first printed board. The light source is disposed on the first printed circuit board to couple to the first printed board and the second printed board. The fixing casing has a contact surface. When the fixing casing is fixed onto the fixing parts of the second printed circuit board and the first printed circuit board, the contact surface contacts the fixing part so that the second printed circuit board is clamped between the contact surface and the first printed circuit board.

16 Claims, 7 Drawing Sheets

LIGHT MODULE

BACKGROUND OF THE INVENTION

1. Field of the Invention

The present disclosure relates to a light module; particularly, the present disclosure relates to a light module for enhancing the connection between the printed circuit boards.

2. Description of the Prior Art

In pursuit of short, small, light, and thin electronic devices, the traditional cathode ray tube (CRT) display devices are gradually replaced with flat panel display devices, which are characterized in small volume, low power consumption, etc. Consequently, the flat panel display devices have become the mainstream product in the display market.

There are various types of flat panel display devices, wherein liquid crystal display devices using the liquid crystal display technology are the most popular type and widely used in many aspects, such as the computer display device and the liquid crystal television. Because the liquid crystal display device is not a self-luminous type display device, a backlight unit is required to provide light for display. In recent years, as the environmental consciousness and other techniques are concerned, the light-emitting components used in the backlight unit have turned to the light emitting diodes (LEDs). The LEDs are usually disposed on the printed circuit board to form a LED light bar in the backlight unit. The LED light bar is usually connected to an external circuit through a flexible circuit to control the activation of the backlight unit.

FIG. 1A is a schematic view of a conventional backlight module used in the LCD device. The backlight module includes a light module 60 composed of a LED light bar and a flexible circuit, a lamp housing 70 for accommodating the LED light bar, a group of optical films 80, and a base frame 40. As shown in FIG. 1B, the light module includes a first printed circuit board 10, a second printed circuit board 20, a light source 30, and a tape 50, wherein the light source 30 is disposed on and electrically connected to the first printed circuit board 10. The flexible second printed circuit board 20 is also electrically connected to the first printed circuit board 10, so that an external circuit may transmit a control signal to the light source 30 of the first printed circuit board 30 to control the activation of the light source 30. As shown in FIG. 1B, in addition to the electrical connection between the first printed circuit board 10 and the second printed circuit board 20, the tape 50 is configured to enhance the tensile force of the second printed circuit board 20 and the fixation between the two printed circuit boards.

However, the process of attaching the tape 50 is time-consuming and by attaching or detaching the tape 50 during assembly and rework, the circuits at the junction between the first printed circuit board 10 and the second printed circuit board 20 are susceptible to damage or even broken.

SUMMARY OF THE INVENTION

It is an objet of the present invention to provide a light module for increasing the assembly efficiency.

It is another object of the present invention to provide a light module for enhancing the connection between the printed circuit boards and reducing the probability of broken circuit at the junction of the printed circuit boards.

The light module of the present invention includes a first printed circuit board, a second printed circuit board, a light source, and a fixing casing. The first printed circuit board has a first fixing part and a first connection part; the second printed circuit board has a second fixing part and a second connection part, wherein the first connection part is situated on the first fixing part, the second connection part is situated on the second fixing part, and the first connection part is electrically connected to the second connection part, so that the second fixing part is attached to the first fixing part. The light source is disposed on the first printed circuit board and is electrically connected to the first connection part of the first printed circuit board. By electrically connecting the first connection part and the second connection part, an external circuit may transmit a signal through the second printed circuit board to the light source located on the first printed circuit board to control the activation of the light source. The fixing casing has a first contact surface. When the fixing casing is fixed onto the fixing parts of the two printed circuit boards, the first contact surface may contact the second fixing part to dispose the second printed circuit board between the first contact surface of the fixing casing and the first printed circuit board.

By utilizing the fixing casing to cover the fixing parts of the two printed circuit boards, the first contact surface of the fixing casing may protect the electrical connection area of the two printed circuit boards to reduce the probability of broken circuit. Moreover, the fixing casing provides fixation to enhance the connection between two printed circuit boards and to prevent the occurrence of damage caused by interactions between the two printed circuit boards.

DETAILED DESCRIPTION OF THE PREFERRED EMBODIMENT

Figure 1A:
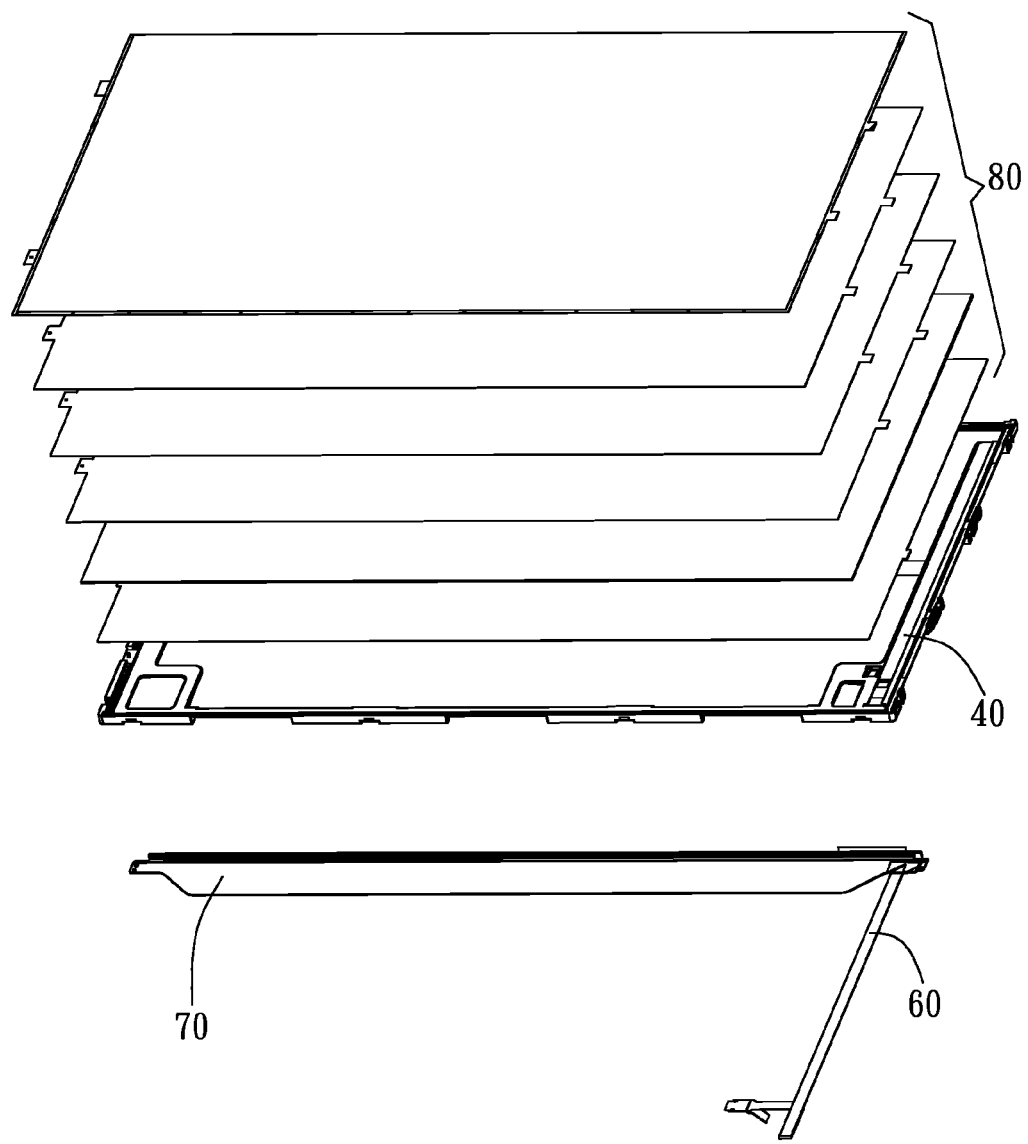
FIG. 1A is a schematic view of a conventional backlight module.
Figure 1B:
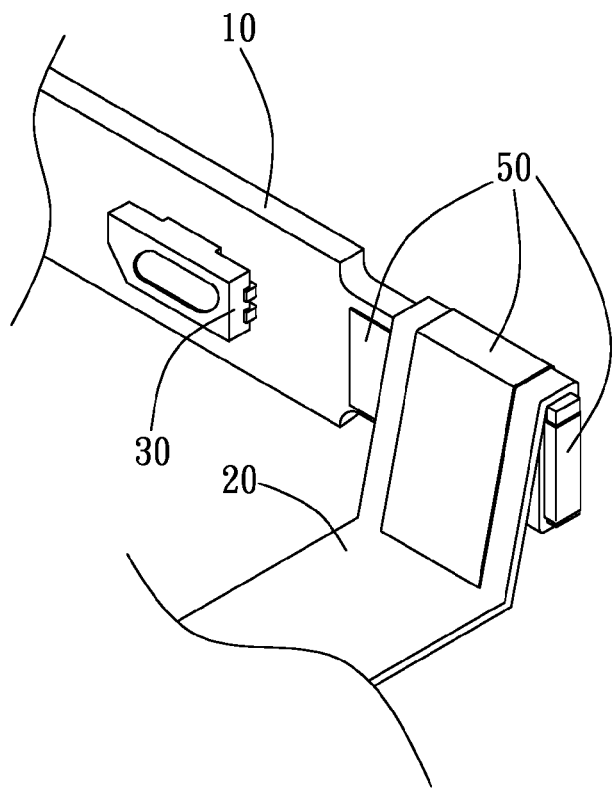
FIG. 1B is a schematic view of a conventional light module.
Figure 2A:
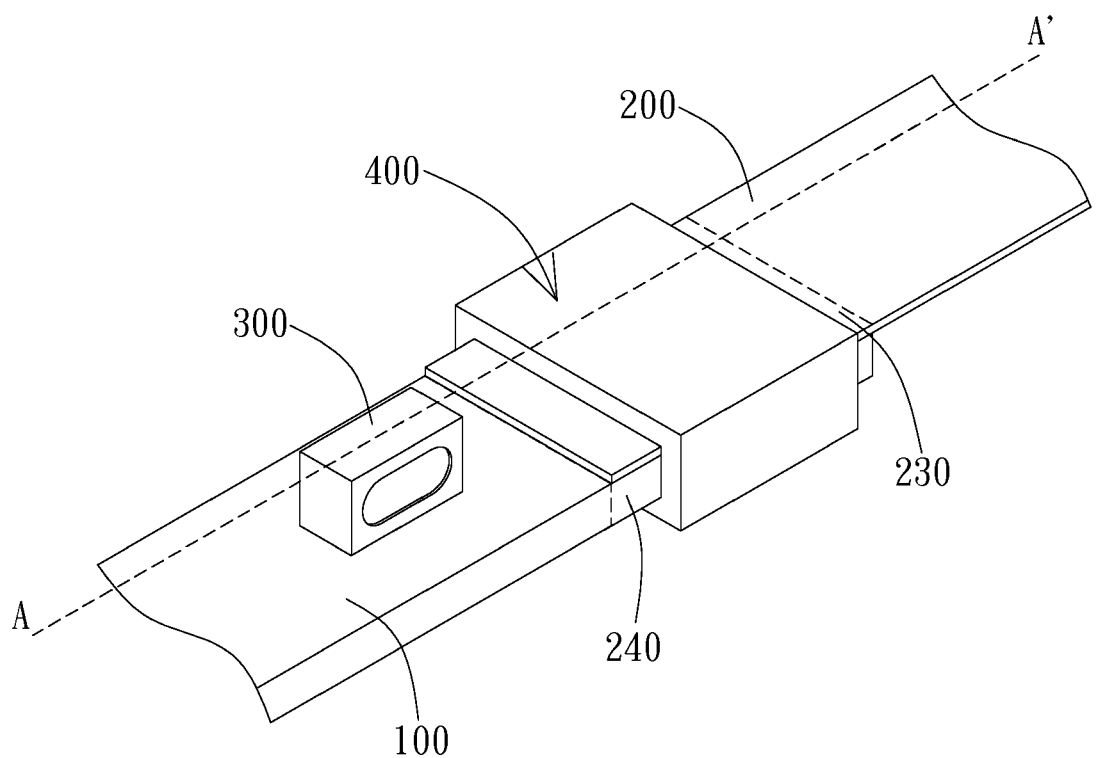
FIG. 2A is a schematic view of an embodiment of the light module.

The one or some embodiments of the invention provide a light module. The light module includes a first printed circuit board 100, a second printed circuit board 200, a plurality of light sources 300, and a fixing casing 400. As shown in FIG. 2A, the light source 300 is disposed on the first circuit board 100 and is electrically coupled with the first printed circuit board 100 and the second printed circuit board 200, so that an external circuit can control the light sources 300 through the first printed circuit board 100 and the second printed circuit board 200. The second printed circuit board 200 has a second fixing part 230 disposed on one end of the second printed circuit board 200, wherein the second fixing part 230 of the second printed circuit board 200 is attached to the first fixing part 240 of the first printed circuit board 100, so that the two printed circuit boards 100, 200 are electrically connected to each other. As shown in FIG. 2A, the first printed circuit board 100 and the second printed circuit board 200 are collinearly attached to each other, having similar width or substantially the same width. But, it's not limited to. After the first printed circuit board 100 and the second printed circuit board 200 are attached, other parts of the two printed circuit boards are respectively extended in opposite parallel directions, so that by means of the fixing casing 400, the fixing parts of the two printed circuit boards are connected and fixed. In the embodiment of the present invention, the light source 300 is a light emitting diode having advantages of power saving and space saving, and the activation of the light emitting diode may be controlled by the circuit. One light emitting diode is provided as shown in drawings of the present invention, but people skilled in the art shall understand that there may be a plurality of light emitting diodes. Besides, the side-lighting light emitting diode is illustrated in the embodiment, but it is not limited thereto. In another embodiment, the light source 300 is all kind of the light device controlled by electricity, such as a light bulb.

Figure 2B:
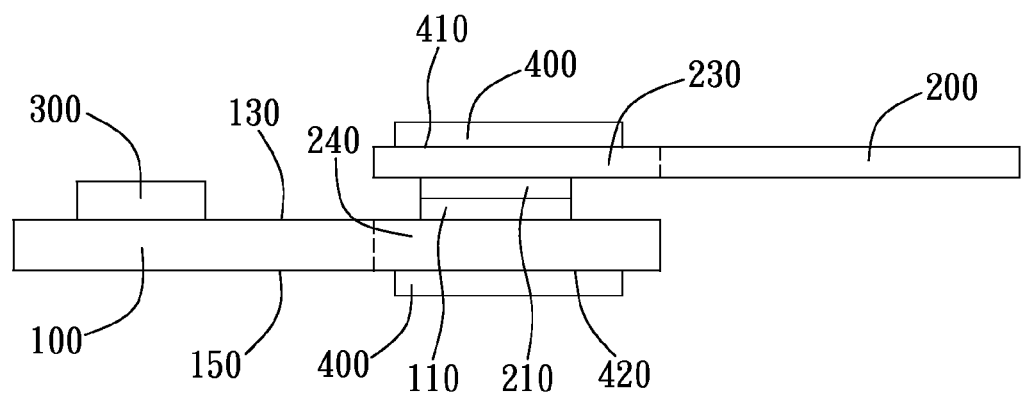
FIG. 2B is a cross-sectional view of an embodiment of the light module.

FIG. 2B is a cross-sectional view of the light module along line AA' of FIG. 2A. As shown in FIG. 2B, the first printed circuit board 100 has the first fixing part 240, a first surface 130, and a first connection part 110, wherein the first connection part 110 is situated on the first fixing part 240; the first connection part 110 and the light source 300 are respectively disposed on the first surface 130 of the first printed circuit board 100, so that the light source 300 can electrically connect to the first connection part 110 through the circuits of the first printed circuit board 110. In this embodiment, the first printed circuit board 100 is preferably a rigid printed circuit board; the first connection part 110 of the first printed circuit board 100 is made of a conductive material such as copper and aluminum for electrical connection. As shown in FIG. 2B, a second connection part 210 is disposed on the second fixing part 230 of the second printed circuit board 200 that electrically connects to the external circuit. The second connection part 210 is made of conductive material such as copper and aluminum. The first connection part 110 of the first printed circuit board 100 and the second connection part 210 of the second printed circuit board 200 are electrically connected to each other, so that the external circuit can control the activation of the light source 300 on the first printed circuit board 100 through the second printed circuit board 200. In this embodiment, the second printed circuit board 200 is preferably a flexible printed circuit board; the first connection part 110 and the second connection part 210 are electrically connected by hot-pressing, soldering, or other welding techniques.

As the embodiments shown in FIG. 2A and FIG. 2B, the fixing casing 400 covers the first fixing part 240 of the first printed circuit board 100 and the second fixing part 230 of the second printed circuit board 200, wherein inside the fixing casing 400, the fixing casing 400 has a first contact surface 410 and a second contact surface 420. When the fixing casing 400 covers the first printed circuit board 100 and the second printed circuit board 200, the first contact surface 410 of the fixing casing 400 may contact the second fixing part 230 of the second printed board 200, so that the second fixing part 230 is clamped between the first contact surface 410 of the fixing casing 400 and the first fixing part 240 of the first printed circuit board 100. In other words, the fixing casing 400 wraps the first fixing part 240 and the second fixing part 230 to dispose them in/between the fixing casing 400. Meanwhile, the first fixing part 240 of the first printed circuit board 100 and the second fixing part 230 of the second printed circuit board 200 are clamped between the first contact surface 410 and the second contact surface 420. In this embodiment, the fixing casing 400 is a fixing component having structure and function similar to a sleeve, so that the first printed circuit board 100 and the second printed circuit board 200 can enter into the fixing casing 400 and the portions of the printed circuit boards entering into the fixing casing 400 can be covered by the fixing casing 400. That is, the first printed circuit board 100 and/or the second printed circuit board 200 passes through the fixing casing 400. It results the fixing casing 400 to wrap the first and/or second printed circuit board. Therefore, covering the first fixing part 240 and the second fixing part 230 by the fixing casing 400, the second connection part 210 situated on the second fixing part 230 and the first connection part 110 electrically connected thereto are protected, thus reducing the probability of broken circuit at the junction between the two printed circuit boards. Meanwhile, utilizing the fixing casing 400 to secure the electrical connection area between the two printed circuit boards, the working hours of applying tapes can be decreased and the connection between the two printed circuit boards is enhanced. In this embodiment, the fixing casing 400 is preferably made of soft, fire-resistant, and heat shrinkable material such as rubber, polyvinylchloride (PVC), polyethylene terephthalate (PET), or other polymers with light crosslinking characteristic. Due to the heat shrinkable feature of the fixing casing 400, the fixing casing 400 tightly covers of the first printed circuit board 100 and the second printed circuit board 200 to improve the protection of the fixing casing 400 to the two printed circuit boards and the connection of the two printed circuit boards. In addition, in the embodiments shown in FIG. 2A and FIG. 2B, the length of the fixing casing 400 is not limited to, slightly less than the length of the fixing parts of the two printed circuit boards. When the length of the fixing casing 400 is longer enough to completely cover the fixing parts of the two printed circuit boards, the more complete protection and fixation will be provided.

As shown in FIG. 2B, when the fixing casing 400 is assembled with the two printed circuit boards to form the light module, the second printed circuit board 200 preferably passes through the fixing casing 400 first. Then, the first connection part 110 and the second connection part 210 are electrically connected to each other by hot-pressing, soldering, or welding techniques. After that, the fixing casing 400 is moved to the second fixing part 230 of the second printed circuit board 200, wherein the second fixing part 230 is the electrical connection area of the first printed circuit board 100 and the second printed circuit board 200. Finally, the fixing casing 400 is heated to shrink, so that the electrical connection area of the two printed circuit boards is tightly covered by the fixing casing 400 to enhance the purposes of fixation and protection. In addition to firstly passing the second printed circuit board 200 through the fixing casing 400, the second printed circuit board 200 can be inserted through the fixing casing 400 after the two printed circuit boards are soldered. Furthermore, the fixing casing 400 may be moved to the fixation area of the two printed circuit boards from the first printed circuit board 100 or the second printed circuit board 200. Meanwhile, when the light module needs to rework, it is only required to cut the fixing casing 400 to remove the fixing casing 400.

Figure 2C:
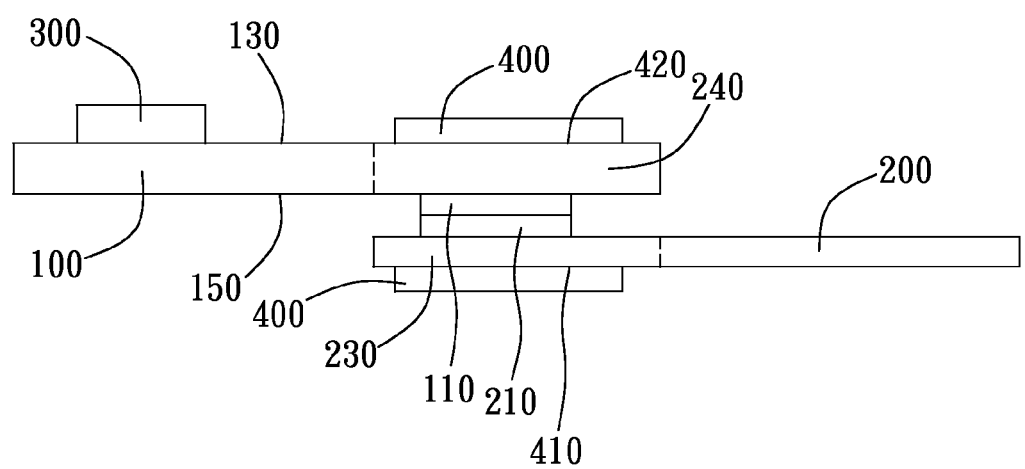
FIG. 2C is a cross-sectional view of another embodiment of the light module.

FIG. 2C is a cross-sectional view of another embodiment along the line AA' of FIG. 2A. In this embodiment, the fixing casing 400 is a fixing component having structure and function similar to a sleeve, so that the first printed circuit board 100 and the second printed circuit board 200 can enter into the fixing casing 400 and the portions of the printed circuit boards entering into the fixing casing 400 can be covered by the fixing casing 400. Comparing to the embodiment shown in FIG. 2B, the light source 300 in this embodiment is disposed on the first surface 130 of the first printed circuit board 100 while the first connection part 110 is disposed on the second surface 150 opposite to the first surface 130, so that the light source 300 and the first connection part 110 are located on opposite surfaces of the first printed circuit board 100. In this embodiment, the light source 300 and the first connection part 110 are disposed on different surfaces of the first printed circuit board 100 to enhance the flexibility in subsequent assembly of the light module. Different from the conventional light module, in this embodiment, the light source 300 and the first connection part 110 are not limited to be disposed on the same surface.

Figure 3A:
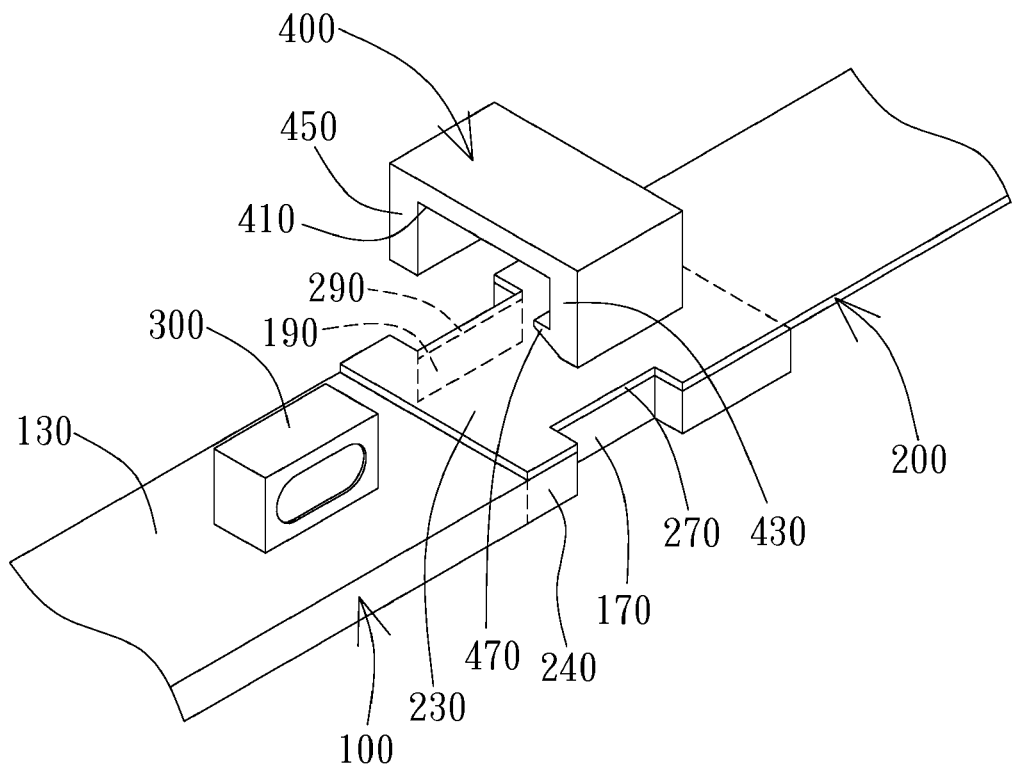
FIG. 3A is a schematic view of another embodiment of the light module.

As shown in FIG. 3A, the fixing casing 400 has a first contact surface 410, a first sidewall 430, a second side wall 450, and a first engaging portion 470 (e.g. a hook portion) connected to the first sidewall 430. One end of the first side wall 430 and one end of the second sidewall 450 are connected to the first contact surface 410. The first sidewall 430 and the second side wall 450 are substantially perpendicular to the first contact surface 410. In other embodiments, the first sidewall 430 and the second side wall 450 may be connected to the first contact surface 410 at other angle instead of right angle. In other words, the first side wall 430 and the second side wall 450 protrude from the contact surface 410, and the first side wall 430, the second side wall 450 and the contact surface 410 are not co-plane. In the embodiment, the first sidewall 430 and the second sidewall 450 are substantially parallel to each other. But it's not limited to. In this embodiment, the first fixing part 240 of the first printed circuit board 100 has a first opening 170 and a second opening 190; the second fixing part 230 of the second printed circuit board 200 has a third opening 270 and a fourth opening 290, wherein the first opening 170 and the second opening 190 are two notches recessed at two opposite edges of the first printed circuit board 100 to form open type openings on the first printed circuit board 100, so that the width between the two openings 170, 190 is smaller than the width at other portions of the first printed circuit board 100. That is, the first opening 170 and the second opening 190 are open-looped openings. The third opening 270 and the fourth opening 290 are two notches recessed at the two opposite edges of the second printed circuit board 200 to form open type openings on the second printed circuit board 200, so that the width between the two openings 270, 290 is smaller than the width at other portions of the second printed circuit board 200. That is, the third opening 270 and the fourth opening 290 are open-looped openings. As shown in FIG. 3A, the first opening 170 is aligned to the third opening 270 and the second opening 190 is aligned to the fourth opening 290. By fixing the fixing casing 400 to the electrically connected first printed circuit board 100 and second printed circuit board 200, the first sidewall 430 of the fixing casing 400 fits into the first opening 170 and the third opening 270, the second sidewall 450 of the fixing casing 400 fits into the second opening 190 and the fourth opening 290. In other words, the first opening 170 and the third opening 270 are the accommodation for the first sidewall 430, and the second opening 190 and fourth opening 290 are the accommodation for the second sidewall 450. Utilizing the first engaging portion 470 of the first sidewall 430 to engage the underside of the first printed circuit board 100, the first contact surface 410 of the fixing casing 400 intimately contacts the second fixing part 230 of the second printed circuit board 200, so that the first printed circuit board 100 and the second printed circuit board 200 are clamped between the first engaging portion 470 and the first contact surface 410. Therefore, by fitting the two sidewalls of the fixing casing 400 into the openings of two printed circuit boards, the fixing casing 400 is prevented from sliding in horizontal direction so as to place the fixing parts of the two printed circuit boards in between the first engaging portion 470 and the first contact surface 410 and to protect the electrical connection area of the two printed circuit boards. In addition, with the structure of two sidewalls, two sides of the two printed circuit boards are also protected to reduce the occurrence of broken circuit caused by external force and to enhance the fixation of the two printed circuit boards in horizontal and vertical directions.

Figure 3B:
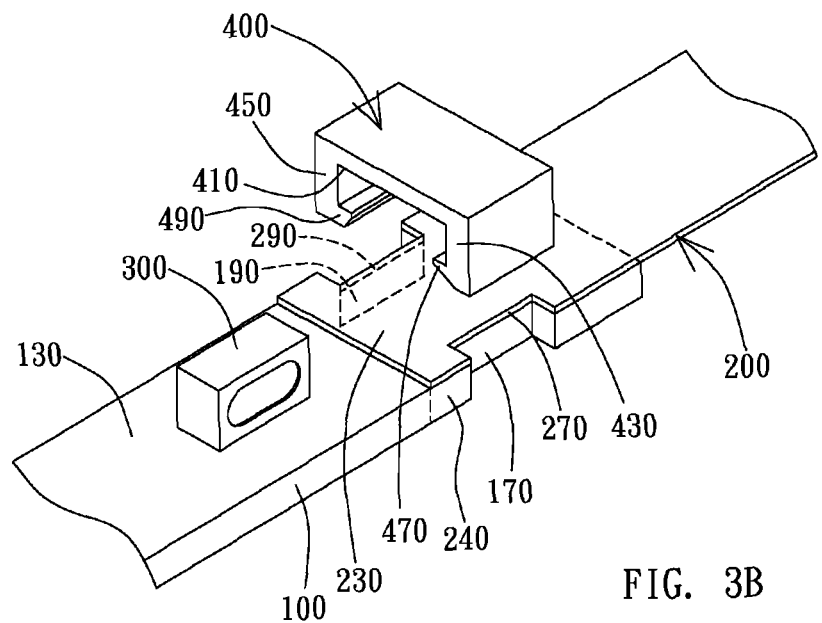
FIG. 3B is a schematic view of another embodiment of the light module.

In another embodiment shown in FIG. 3B, the fixing casing 400 has a first contact surface 410, a first sidewall 430, a second side wall 450, a first engaging portion 470 connected to the first sidewall 430, and a second engaging portion 490 connected to the second sidewall 450, wherein one end of the first side wall 430 and one end of the second sidewall 450 are connected to the first contact surface 410. The first sidewall 430 and the second sidewall 450 are substantially perpendicular to the first contact surface 410, and two sidewalls 430, 450 are substantially parallel to each other. In this embodiment, when the fixing casing 400 is fixed onto the two electrically connected printed circuit boards 100, 200, the first sidewall 430 of the fixing casing 400 is accommodated in the first opening 170 of the first printed circuit board 100 and the third opening 270 of the second printed circuit board 200; the second sidewall 450 of the fixing casing 400 is accommodated in the second opening 190 of the first printed circuit board 100 and the fourth opening 290 of the second printed circuit board 200. Comparing to the embodiment shown in FIG. 3A, the first fixing part 240 of the first printed circuit board 100 and the second fixing part 230 of the second printed circuit board 200 shown in FIG. 3B are between the first engaging portion 470 and the first contact surface 410 and between the second engaging portion 490 and the first contact surface 410 of the first casing 400. Therefore, by engaging the engaging portions with the printed circuit board, not only the electrical connection area and two sides of two printed circuit boards are protected to reduce the probability of broken circuit, but the fixation and the connection between the two printed circuit boards in horizontal and vertical directions are also enhanced. As shown in FIG. 3A and FIG. 3B, the light source 300 is disposed on the first surface 130 of the first printed circuit board 100 and is electrically connected to the first connection part 110 of the first surface 130, so that an external circuit may transmit a signal through the second printed circuit board 200 to the light source 300 of the first printed circuit board 100 to control the activation of the light source 300. In this embodiment, the first printed circuit board 100 is preferably a rigid printed circuited board; the second printed circuit board 200 is preferably a flexible printed circuited board; the fixing casing 400 is preferably made of a material with certain rigidity such as hard rubber or plastics. The widths of the first opening 170 and the third opening 270 are larger than the width of the first sidewall 430, so that the width of overlapping area of the first opening 170 and the third opening 270 formed by electrically connecting the two printed circuit boards is larger than the width of the first sidewall 430. Meanwhile, the widths of the second opening 190 and the fourth opening 290 are larger than the width of the second sidewall 450, so that the width of overlapping area of the second opening 190 and the fourth opening 290 formed by electrically connecting the two printed circuit boards is larger than the width of the second sidewall 450.

Figure 3C:
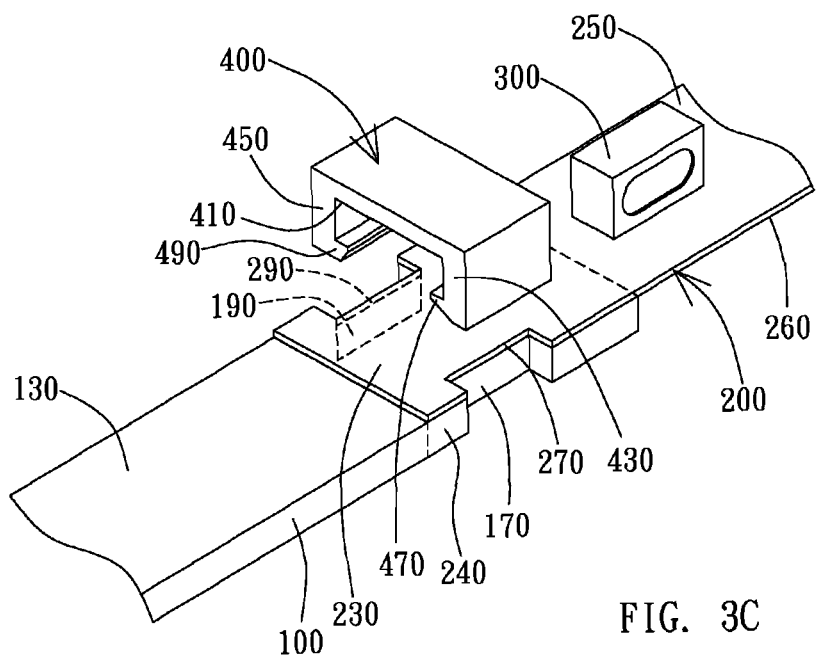
FIG. 3C is a schematic view of another embodiment of the light module.

As shown in FIG. 3C, the light source 300 is disposed on the third surface 250 of the second printed circuit board 200 and is electrically connected to the second connection part 210, wherein the second connection part 210 is disposed on the fourth surface 260 opposite to the third surface 250, so that the second connection part 210 for electrical connection and the light source 300 are disposed on two opposite surfaces of the second printed circuit board 200 to enhance the flexibility and deployment in subsequent assembly of the light source 300 and to reduce the inconvenience of disposing the light source 300 and the electrical connection part on the same surface.

Besides, as shown in FIG. 3A, FIG. 3B, and FIG. 3C, the second printed circuit board 200 is attached to the first surface 130 of the first printed circuit board 100 and the two printed circuit boards are fixed by the fixing casing 400 in top-down fashion. However, one variation of the embodiment shown in FIG. 3A, FIG. 3B, and FIG. 3C is that the second printed circuit board 200 is attached to the second surface 150 which is opposite to the first surface 130 of the first printed circuit board 100 and the two printed circuit boards are fixed by the fixing casing 400 in bottom-up fashion for fixation and protection. Meanwhile, in the embodiments mentioned above, when two printed circuit boards are fixed by the fixing casing 400, the second printed circuit board 200 is, but not limit to, located between the first printed circuit board 100 and the first contact surface 410 of the fixing casing 400. However, in other embodiments, the fixing casing 400 may have different fixation directions such as in top-down fashion or in bottom-up fashion to allow the first printed circuit board 100 to be clamped between the first contact surface 410 of the fixing casing 400 and the second printed circuit board 200 according to different assembling and fixation manners.

As shown in FIG. 3A, FIG. 3B, and FIG. 3C, the fixing casing 400 has two sidewalls, such as the first side wall 430 and the second sidewall 450. In another embodiment, the fixing casing 400 has one sidewall and one engaging portion to secure the fixing casing 400 and printed circuit boards together. That is, the amount of the sidewall and the engaging portion are depended on the design or the fix force. As shown in FIG. 3A, FIG. 3B, and FIG. 3C, the first opening and second opening are align to each other and they are overlapped to each other in the length direction of the printed circuit boards, but it's not limited to. The first opening 170 and second opening 190 are interlace to each other, that is, the first opening 170 and second opening 190 are overlapped to each other partially and are not overlapped to each other in the length direction of the printed circuit boards. The situation of the third opening 270 and the fourth opening 290 are analogy to the first opening 170 and the second opening 190, such as the third opening 270 are not overlapped with the fourth opening 290 in the length direction of the printed circuit boards.

Figure 4:
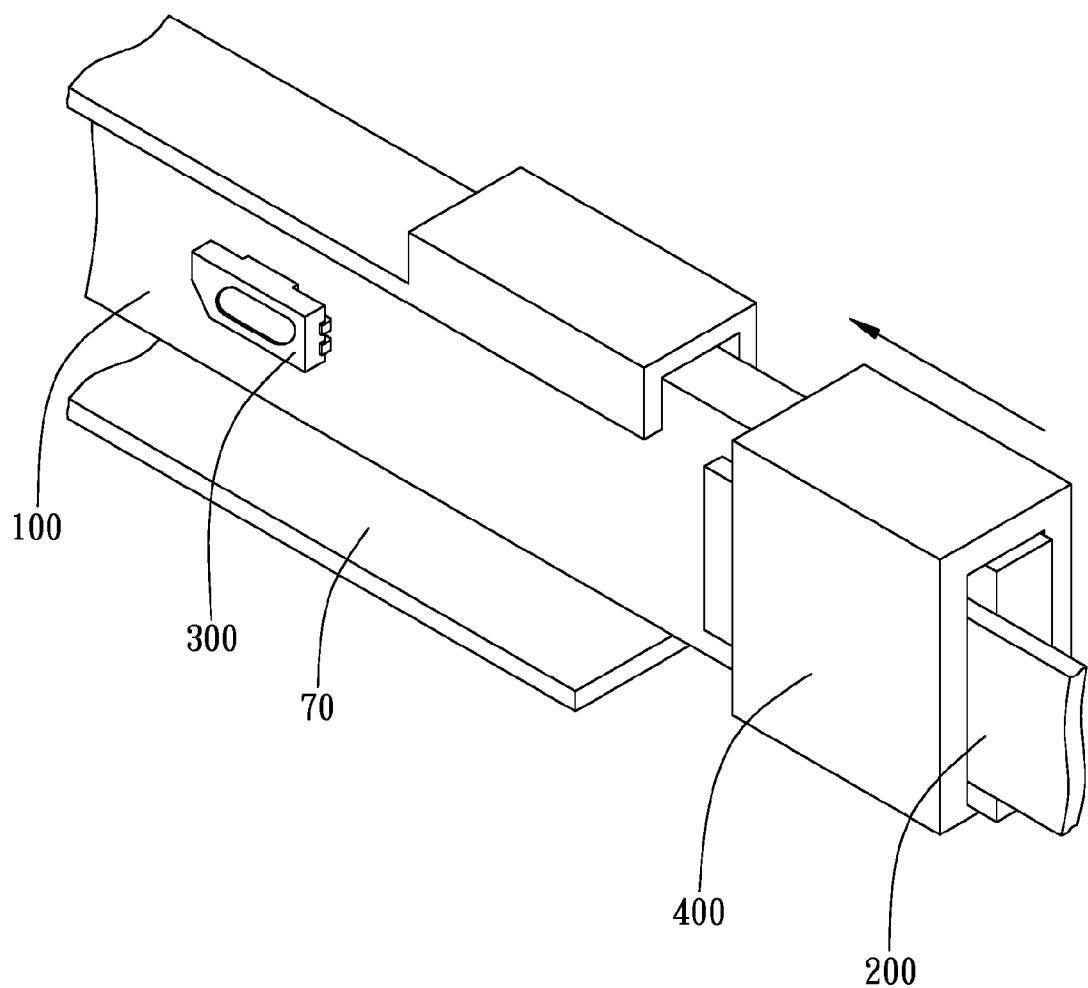
FIG. 4 is a schematic view of another embodiment of the light module.

As shown in FIG. 4, the light module 60 having a first printed circuit board 100, a second printed circuit board 200, a light source 300, and a fixing casing 400 is assembled with the lamp housing 70 to form a backlight module. In order to fit various backlight modules, the fixing casing 400 which fixes the first printed circuit board 100 and the second printed circuit board 200 may be determined whether to be accommodated in the lamp housing 70 or not during assembly. If the fixing casing 400 is determined to be accommodated in the lamp housing 70 during assembling the backlight module, the portion of the lamp housing 70 corresponding to the fixing casing 400 may be enlarged by utilizing pressing or other methods to have a larger space for accommodating the fixing casing 400 and to increase the convenience of placing the light module with fixing casing 400 in the lamp housing 70.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A light module, comprising:
  a first printed circuit board having a first fixing part;
  a second printed circuit board having a second fixing part, wherein the second fixing part is attached to the first fixing part, the first printed circuit board and the second printed circuit board are collinearly attached to each other;
  a light source electrically coupling with the first printed circuit board and the second printed circuit board; and
  a fixing casing covering the first fixing part and the second fixing part, the fixing casing having a contact surface, wherein the contact surface contacts the second fixing part, the second fixing part is located between the first fixing part of the first printed board and the contact surface; wherein the fixing casing is a heat shrinkable sleeve.

2. The light module of claim 1, wherein the first fixing part has a first connection part, the second fixing part has a second connection part, and the first connection part is electrically connected to the second connection part.

3. The light module of claim 2, wherein the light source and the first connection part are both disposed on a first surface of the first printed circuit board, and the light source is electrically connected to the first connection part.

4. The light module of claim 2, wherein the light source is disposed on a first surface of the first printed circuit board, the first connection part is disposed on a second surface opposite to the first surface, and the light source is electrically connected to the first connection part.

5. The light module of claim 2, wherein the first fixing part has a first opening, the second fixing par has a third opening, the first opening and the third opening are both open-looped openings and are aligned with each other.

6. The light module of claim 5, wherein the light source and the first connection part are both disposed on a first surface of the first printed circuit board, and the light source is electrically connected to the first connection part.

7. The light module of claim 5, wherein the light source is disposed on a third surface of the second printed circuit board, the second connection part is disposed on a fourth surface opposite to the third surface, and the light source is electrically connected to the second connection part.

8. The light module of claim 5, wherein the first printed circuit board has a second opening, the second fixing part of the second printed circuit board has a fourth opening, and the second opening and the fourth opening are both open-looped openings and are aligned with each other.

9. The light module of claim 8, wherein the light source and the first connection part are both disposed on a first surface of the first printed circuit board, and the light source is electrically connected to the first connection part.

10. The light module of claim 8, wherein the light source is disposed on a third surface of the second printed circuit board, the second connection part is disposed on a fourth surface opposite to the third surface, the light source is electrically connected to the second connection part.

11. The light module of claim 8, wherein the light source and the first connection part are both disposed on a first surface of the first printed circuit board, and the light source is electrically connected to the first connection part.

12. The light module of claim 8, wherein the light source is disposed on a third surface of the second printed circuit board, the second connection part is disposed on a fourth surface opposite to the third surface, and the light source is electrically connected to the second connection part.

13. A light module, comprising:
- a first printed circuit board having a first fixing part;
- a second printed circuit board having a second fixing part, wherein the second fixing part connects the first fixing part, the first printed circuit board and the second printed circuit board are collinearly attached to each other;
- a light source coupling with the first printed circuit board and the second printed circuit board; and
- a heat shrinkable sleeve wrapping the first fixing part and the second fixing part, the inside of the heat shrinkable sleeve having a first contact surface and a second contact surface, wherein the first fixing part and the second fixing part are disposed between the first contact surface and the second contact surface.

14. The light module of claim 13, wherein the first fixing part has a first connection part, the second fixing part has a second connection part, and the first connection part is electrically connected to the second connection part.

15. The light module of claim 14, wherein the first connection part and the light source are disposed on a surface of the first printed circuit board.

16. The light module of claim 14, wherein the first connection part is disposed on a surface of the first printed board, and the light source is disposed on a rear surface opposite to the surface.

* * * * *